(12) United States Patent
Yang et al.

(10) Patent No.: US 12,365,383 B2
(45) Date of Patent: Jul. 22, 2025

(54) STEERING SYSTEM AND VEHICLE

(71) Applicant: BYD COMPANY LIMITED, Guangdong (CN)

(72) Inventors: Dongsheng Yang, Shenzhen (CN); Jianxin Wang, Shenzhen (CN); Jun Su, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 698 days.

(21) Appl. No.: 17/771,804

(22) PCT Filed: Sep. 23, 2020

(86) PCT No.: PCT/CN2020/117119
§ 371 (c)(1),
(2) Date: Apr. 25, 2022

(87) PCT Pub. No.: WO2021/077969
PCT Pub. Date: Apr. 29, 2021

(65) Prior Publication Data
US 2022/0396305 A1 Dec. 15, 2022

(30) Foreign Application Priority Data
Oct. 25, 2019 (CN) .......................... 201911023005.5

(51) Int. Cl.
*B62D 5/04* (2006.01)
*B62D 5/00* (2006.01)

(52) U.S. Cl.
CPC .......... *B62D 5/0415* (2013.01); *B62D 5/003* (2013.01); *B62D 5/006* (2013.01)

(58) Field of Classification Search
CPC .................................................. B62D 5/0415
See application file for complete search history.

(56) References Cited

U.S. PATENT DOCUMENTS 4,715,462 A 12/1987 Taig
9,683,639 B2 * 6/2017 Kogure ................. B62D 5/043
2005/0082108 A1 4/2005 Husain

FOREIGN PATENT DOCUMENTS

| CN | 101805977 A | 8/2010 |
| CN | 102210933 A | 10/2011 |
| CN | 101767606 B * | 4/2012 |
| CN | 102574545 A | 7/2012 |
| CN | 104506081 A | 4/2015 |
| CN | 105691446 A | 6/2016 |
| CN | 205706842 A | 11/2016 |
| CN | 106515843 A | 3/2017 |
| CN | 106741139 A | 5/2017 |
| CN | 108407887 A | 8/2018 |

(Continued)

OTHER PUBLICATIONS

English Translation of International Search Report from PCT/CN2020/117119 dated Dec. 30, 2020 (2 pages).

*Primary Examiner* — Kevin Hurley
(74) *Attorney, Agent, or Firm* — Calfee, Halter & Griswold LLP (57) ABSTRACT

A steering system and a vehicle are provided. The steering system includes a steering wheel end shaft, a steering device end shaft, and an electric driving mechanism configured to drive decoupling or coupling of the steering wheel end shaft and the steering device end shaft that are coaxially disposed.

19 Claims, 8 Drawing Sheets

(56) References Cited

FOREIGN PATENT DOCUMENTS

| | | | | |
|---|---|---|---|---|
| CN | 108698179 | A | 10/2018 | |
| CN | 208585313 | U | 3/2019 | |
| CN | 109774786 | A | 5/2019 | |
| CN | 110001771 | A | 7/2019 | |
| CN | 110316239 | A | 10/2019 | |
| CN | 110368682 | A | 10/2019 | |
| CN | 108407887 | B * | 11/2019 | ............ B62D 5/005 |
| CN | 214068146 | U * | 8/2021 | ............ G09B 25/02 |
| DE | 20213472 | U1 | 1/2003 | |
| DE | 102014011278 | A1 | 7/2014 | |
| DE | 102014004733 | A1 | 9/2014 | |
| EP | 3202641 | A1 | 8/2017 | |
| IN | 109733468 | A | 5/2019 | |
| JP | H09164971 | A | 6/1997 | |
| JP | 2002145098 | A | 5/2002 | |
| JP | 2007230360 | A | 9/2007 | |
| JP | 2008213587 | A | 9/2008 | |
| JP | 2012172790 | A | 9/2012 | |
| JP | 2015055301 | A | 3/2015 | |

\* cited by examiner

STEERING SYSTEM AND VEHICLE

The present disclosure is the National Stage of PCT International Application No. PCT/CN2020/117119, filed on Sep. 23, 2020, which claims priority to Application No. 201911023005.5 filed on Oct. 25, 2019 and entitled "STEERING SYSTEM AND VEHICLE".

FIELD

The present disclosure relates to the field of vehicles, and more specifically, to a steering system, and further, to a vehicle.

BACKGROUND

With the advancement of science and technology, people have increasingly high requirements for functions of vehicle game entertainment. Racing games such as Need For Speed and QQ Speed bring people experience of crazy driving fun, and therefore have numerous fans. Currently, the above game functions are generally experienced by operating a conventional keyboard or operating a dedicated game steering wheel on a PC side. The conventional keyboard cannot realistically simulate the handfeel of manipulating a steering wheel to turn during driving, and the dedicated gaming steering wheel is bulky and not cost-effective for a user to purchase for use. If the user goes to a relevant entertainment place to operate the dedicated game steering wheel, use requirements of the user cannot be satisfied anytime anywhere as a result of a limited place.

Sitting on a seat in an automobile to directly experience the above games by using a steering wheel of the automobile is a desirable solution. The inventor of the present disclosure found in practice that steering systems, steering wheels, and steering device end shafts of all vehicles currently existing on the market are in a meshed state for a long time. Even if the steering wheel is adjusted in four directions such as upward, downward, forward, and backward directions, a structure (such as splines) for transmitting torque is not disengaged. As a result, turning the steering wheel inevitably drives tires to axially move, resulting in repeated static friction between the tires and the ground. Consequently, the tires are seriously worn, and cannot be accepted by consumers.

SUMMARY

An object of the present disclosure is to provide a steering system having a more compact structure, to overcome the above problems existing in related arts. The steering system can realize decoupling or coupling, thereby preventing a steering wheel from driving wheels to turn when a vehicle enters a game mode, to better protect vehicle tires.

In order to achieve the above object, a first aspect of the present disclosure provides a steering system. The steering system includes a steering wheel end shaft, a steering device end shaft, and an electric driving mechanism configured to drive decoupling or coupling of the steering wheel end shaft and the steering device end shaft that are coaxially disposed.

Optionally, the steering system further includes a torque feedback mechanism. The torque feedback mechanism is configured to, in a decoupled state, apply a damping torque to the steering wheel end shaft according to a torsional torque of the steering wheel end shaft or an angular acceleration variation of the steering wheel end shaft, to enhance an operation feeling of a steering wheel that is connected with the steering wheel end shaft in a transmission way; and/or, the torque feedback mechanism is configured to apply a reset torque to the steering wheel end shaft upon completion of the decoupling, to drive the steering wheel end shaft to be reset to a steering angle before the decoupling.

The torque feedback mechanism is arranged coaxially with the steering wheel end shaft.

Optionally, the steering system further includes an outer housing disposed coaxially with the steering wheel end shaft and the steering device end shaft. The steering wheel end shaft is axially rotatably supported in the outer housing, the steering device end shaft is fixed in the outer housing, and the torque feedback mechanism and/or the electric driving mechanism are/is mounted in the outer housing.

Optionally, the torque feedback mechanism includes:
an outer rotor motor, disposed coaxially with the steering wheel end shaft and configured to provide a driving force; and
a planetary gear reduction mechanism, disposed coaxially with the steering wheel end shaft and configured to transfer, to the steering wheel end shaft, the driving force provided by the outer rotor motor, to apply the damping torque or the reset torque to the steering wheel end shaft.

Optionally, a stator of the outer rotor motor is fixed coaxially with the steering wheel end shaft, and an outer rotor is axially rotatably mounted to the steering wheel end shaft by a rotary bearing.

Optionally, the planetary gear reduction mechanism includes: multiple stages of sun gear mechanisms, arranged coaxially with the steering wheel end shaft, where two adjacent stages of sun gear mechanisms are axially spaced apart from each other; a last-stage sun gear mechanism is fixed coaxially with the steering wheel end shaft; other sun gear mechanisms are axially rotatably mounted to the steering wheel end shaft by rolling bearings; and each stage of the sun gear mechanisms in the other sun gear mechanisms is in gear meshing with planetary gears, where the planetary gears are revolvable around an axis of the stage of the sun gear mechanisms and rotatable around their own axes; a central shaft of the planetary gears meshed with an $N^{th}$-stage sun gear mechanism is connected with an $(N+1)^{th}$-stage sun gear mechanism; N is an integer; N is greater than or equal to 1 and less than a total number of the stages of the sun gear mechanisms; and planetary gears having a central shaft connected with a first-stage sun gear mechanism are in gear meshing with the outer rotor.

Optionally, the torque feedback mechanism includes an inner rotor motor. A rotor of the inner rotor motor is coaxially fixed to the steering wheel end shaft.

Optionally, the electric driving mechanism includes:
a slidable sleeve, sleeved outside the steering wheel end shaft and the steering device end shaft and configured to translate along an axial direction of the steering wheel end shaft and the steering device end shaft to realize decoupling or coupling between the steering wheel end shaft and the steering device end shaft; and
a motor, configured to provide a driving force to drive the slidable sleeve to translate along the axial direction of the steering wheel end shaft and the steering device end shaft.

Optionally, the motor is a linear motor, and a mover of the linear motor is fixedly connected with the slidable sleeve. An elastic element is disposed on at least one axial end of the slidable sleeve to reduce vibration of the slidable sleeve during the translation along the axial direction.

Optionally, the motor is an interior rotor motor, and a rotor of the interior rotor motor is a hollow structure. The hollow structure is axially rotatably mounted to outer sides of the steering wheel end shaft and the steering device end shaft. The slidable sleeve is coaxially disposed in the hollow structure and is threadedly connected with the hollow structure.

Optionally, a limiting groove and splines are formed on an inner circumferential surface of the slidable sleeve along a direction parallel to the axis. A protrusion allowed to be accommodated in the limiting groove is formed on an outer circumferential surface of one of the steering wheel end shaft and the steering device end shaft, and external splines capable of being splined with the slidable sleeve are formed on an outer circumferential surface of the other of the steering wheel end shaft and the steering device end shaft.

Optionally, the steering system further includes an outer housing disposed coaxially with the steering wheel end shaft and the steering device end shaft. The steering wheel end shaft is axially rotatably supported in the outer housing, the steering device end shaft is fixed in the outer housing, and a stator of the motor is fixed in the outer housing.

Optionally, the steering system further includes:

a status sensor, configured to detect the decoupled state or a coupled state of the steering wheel end shaft and the steering device end shaft; and a controller, configured to receive a decoupling instruction or a coupling instruction and control, according to the decoupled state or the coupled state detected by the status sensor, the motor to drive the slidable sleeve to realize decoupling or coupling between the steering wheel end shaft and the steering device end shaft.

Optionally, the status sensor is capable of inspecting the decoupled state or the coupling state of the steering wheel end shaft and the steering device end shaft according to a set period.

Optionally, the steering system further includes an alarm module. The alarm module is configured to send an alarm signal before a vehicle travels and when the status sensor detects that the steering wheel end shaft and the steering device end shaft are in the decoupled state.

Optionally, the status sensor includes a rheostat, a current detection element, and a power supply. The power supply is connected in series with the rheostat to form a circuit. The current detection element is configured to detect a current in the circuit and transmit a detected current signal to the controller. A rheostat slider of the rheostat is fixed to the slidable sleeve.

Optionally, the controller is further capable of stopping controlling the motor when the slidable sleeve is moved to an extreme position.

Based on the steering system provided in the first aspect of the present disclosure, a second aspect of the present disclosure provides a vehicle. The vehicle includes the steering system according to the first aspect of the present disclosure.

The technical solutions in the present disclosure have the following beneficial effects:

In the present disclosure, the steering wheel end shaft is decoupled from or coupled to the steering device end shaft by the electric driving mechanism. In a case that the steering wheel end shaft is coupled to the steering device end shaft, a user turns the steering wheel, and the wheels may be driven to turn. In this case, the vehicle may be in a normal driving mode. In a case that the steering wheel end shaft is decoupled from the steering device end shaft, the user turns the steering wheel, and the wheels are not driven to turn. In this case, the vehicle may be in a game mode. In this way, wheel and tire wear caused by repeated friction between the wheel and the ground during the game mode can be avoided, so as to better protect the vehicle tires.

In addition, the steering wheel end shaft, the steering device end shaft, and the electric driving mechanism are coaxially arranged. In this way, structure compactness of the steering system is improved, a volume of the steering system having the decoupling function is reduced, and installation of the steering system in the vehicle is facilitated.

100—Planetary gear reduction mechanism; 101—Last-stage sun gear mechanism; 102—Second-stage sun gear mechanism; 103—Central shaft; 104—Planetary gear; 105—Central shaft; 106—Planetary gear; 107—Planetary gear; 108—First-stage sun gear mechanism; 109—Central shaft; 110—Rotary bearing; 111—Rotary bearing; 112—Rotary bearing; 113—Rotary bearing; 200—Motor of torque feedback mechanism; 201—Stator of outer rotor motor; 202—Rolling bearing; 203—Outer rotor of outer rotor motor; 204—Lead wire; 280—Inner rotor motor; 300—Electric driving mechanism; 301—Outer housing; 302—Stator of interior rotor motor; 303—Mover of interior rotor motor; 304—Rotating bearing; 305—Lead wire; 306—Rotating bearing; 380—Linear motor; 381—Slidable sleeve; 382—Spring; 403—Bottom plate; 500—Cover plate; 600—Steering wheel end shaft; 605—Protrusion; 700—Steering device end shaft; 701—External spline; 800—Slidable sleeve; 801—Internal spline; 802—External thread; 803—Limiting groove; 900—Steering wheel; 901—Rotation angle sensor; 21—Rheostat; 22—Ammeter; 23—Power supply.

DETAILED DESCRIPTION

In the present disclosure, unless otherwise stated, directional terms such as "up", "down", "left", and "right" are generally up, down, left, and right with reference to the drawings. "Inside/inner side" and "outside/outer side" mean inside and outside relative to a contour of a component.

Referring to FIG. 1 to FIG. 11, a first aspect of embodiments of the present disclosure provides a steering system. The steering system includes a steering wheel end shaft 600, a steering device end shaft 700, and an electric driving mechanism 300 configured to drive decoupling or coupling of the steering wheel end shaft 600 and the steering device end shaft 700 that are coaxially disposed.

Figure 1:
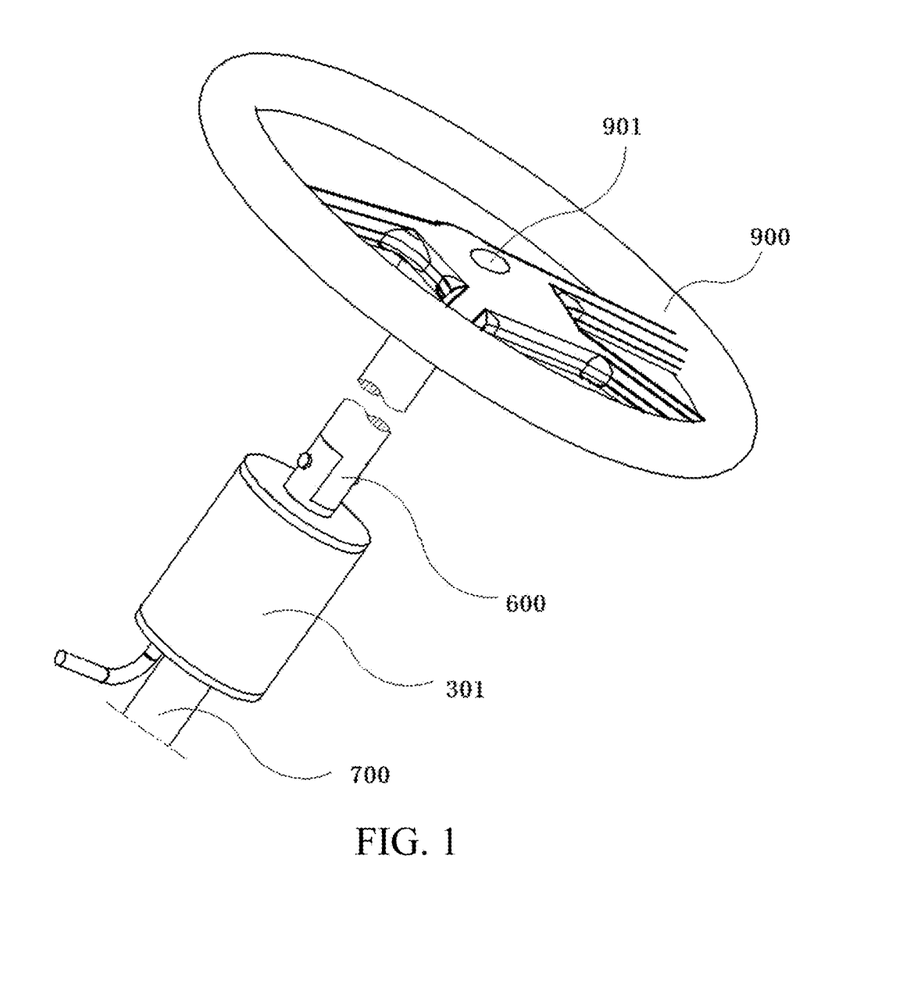
FIG. 1 is a schematic diagram of an overall structure of a steering system according to an embodiment of the present disclosure.
Figure 2:
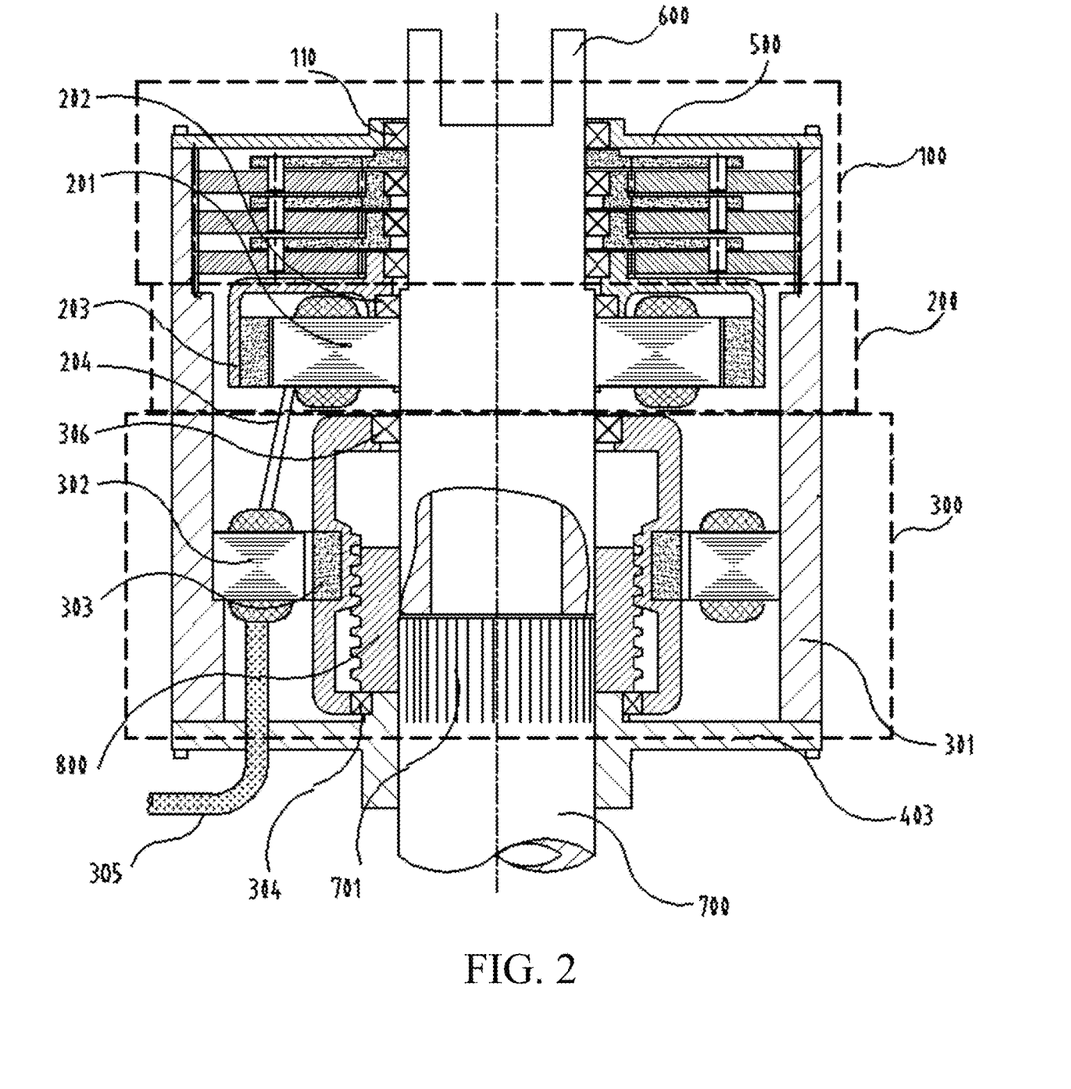
FIG. 2 is a longitudinal cross-sectional view of a steering system in a coupled state according to an embodiment of the present disclosure.
Figure 3:
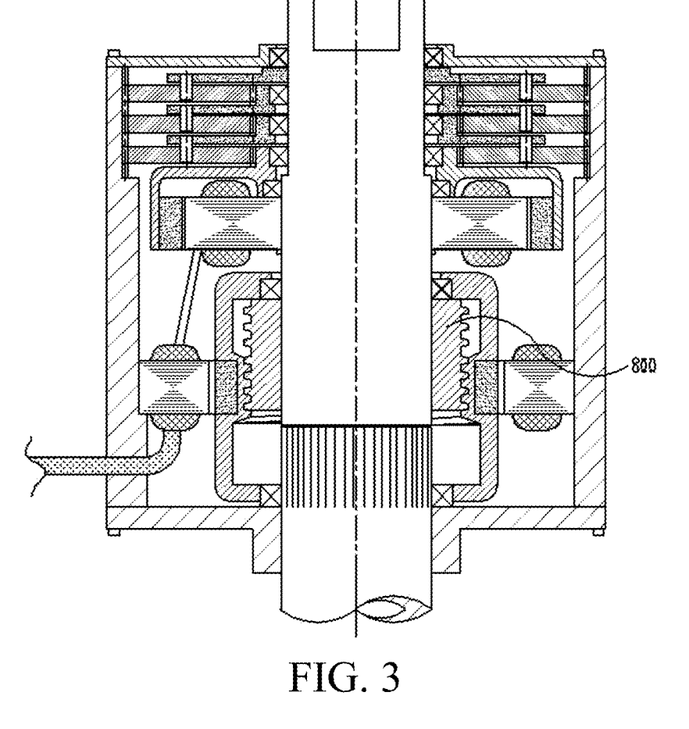
FIG. 3 is a longitudinal cross-sectional view of a steering system in a decoupled state according to an embodiment of the present disclosure.

The steering wheel end shaft 600 is a rotary shaft that is connected with a steering wheel 900 in a transmission way, and the steering device end shaft 700 is a rotary shaft that is connected with wheels in a transmission way. In a case that the steering wheel end shaft 600 is coupled to the steering device end shaft 700, the vehicle may enter a normal driving mode at this time, and a user turns the steering wheel 900 to turn the wheels. In a case that the steering wheel end shaft 600 is decoupled from the steering device end shaft 700, the vehicle may enter a game mode at this time. The user turns the steering wheel 900, and the wheels are not driven to turn. In this way, wheel and tire wear caused by repeated friction between the wheel and the ground during the game mode can be avoided, so as to better protect the vehicle tires.

In addition, the steering wheel end shaft 600, the steering device end shaft 700, and the electric driving mechanism 300 are coaxially arranged. In this way, structure compactness of the steering system is improved, a volume of the steering system having the decoupling function is reduced, and installation of the steering system in the vehicle is facilitated.

Figure 7:
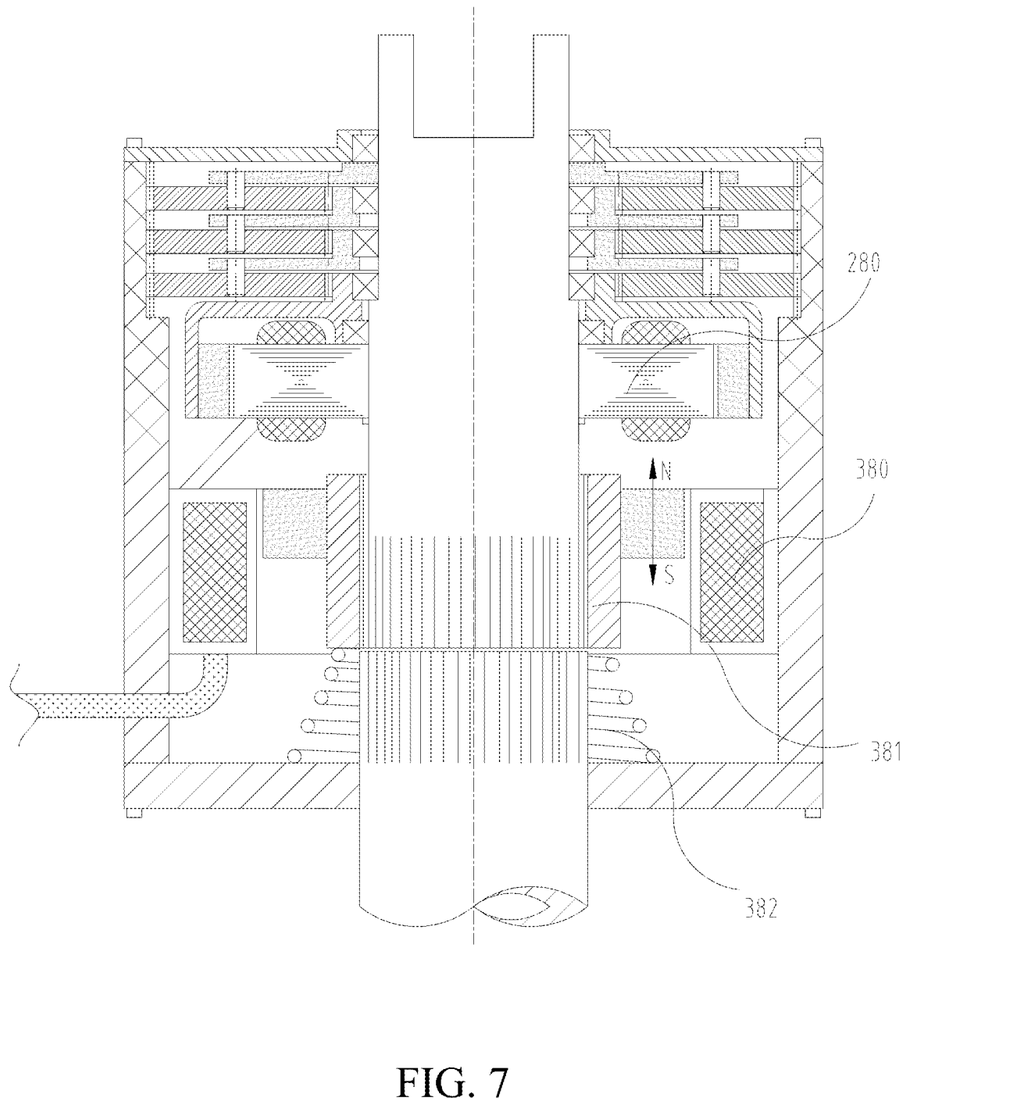
FIG. 7 is a longitudinal cross-sectional view of a steering system in a decoupled state according to another embodiment of the present disclosure.
Figure 8:
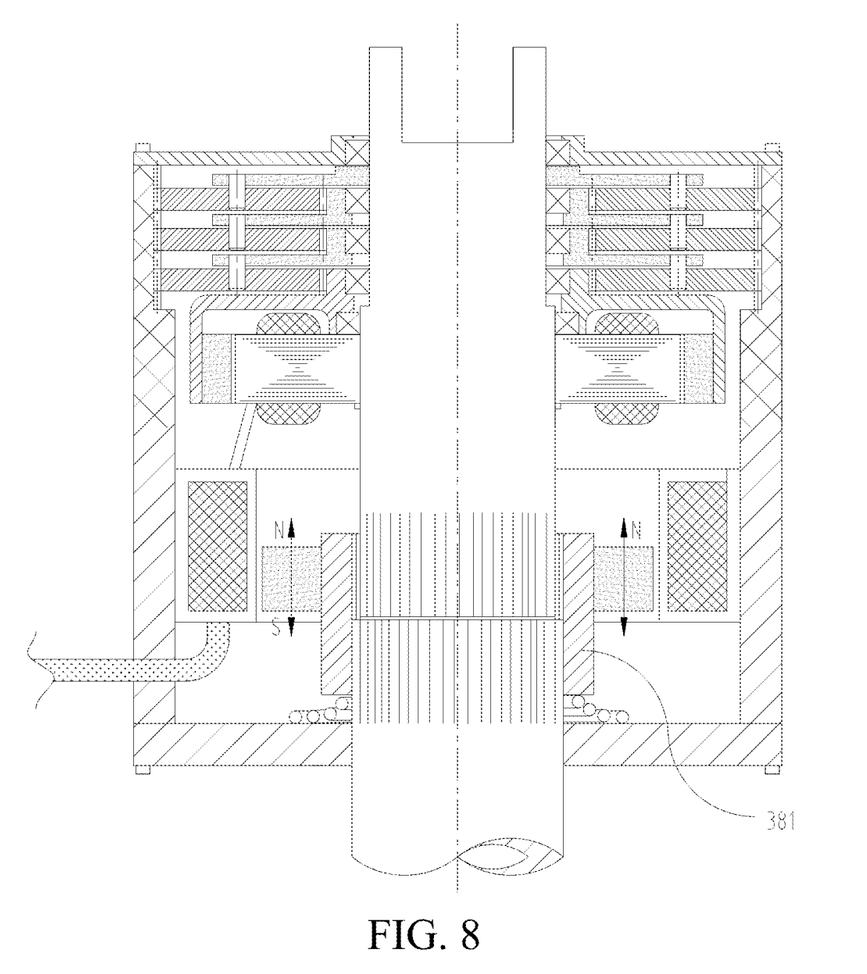
FIG. 8 is a longitudinal cross-sectional view of a steering system in a coupled state according to another embodiment of the present disclosure.
Figure 9:
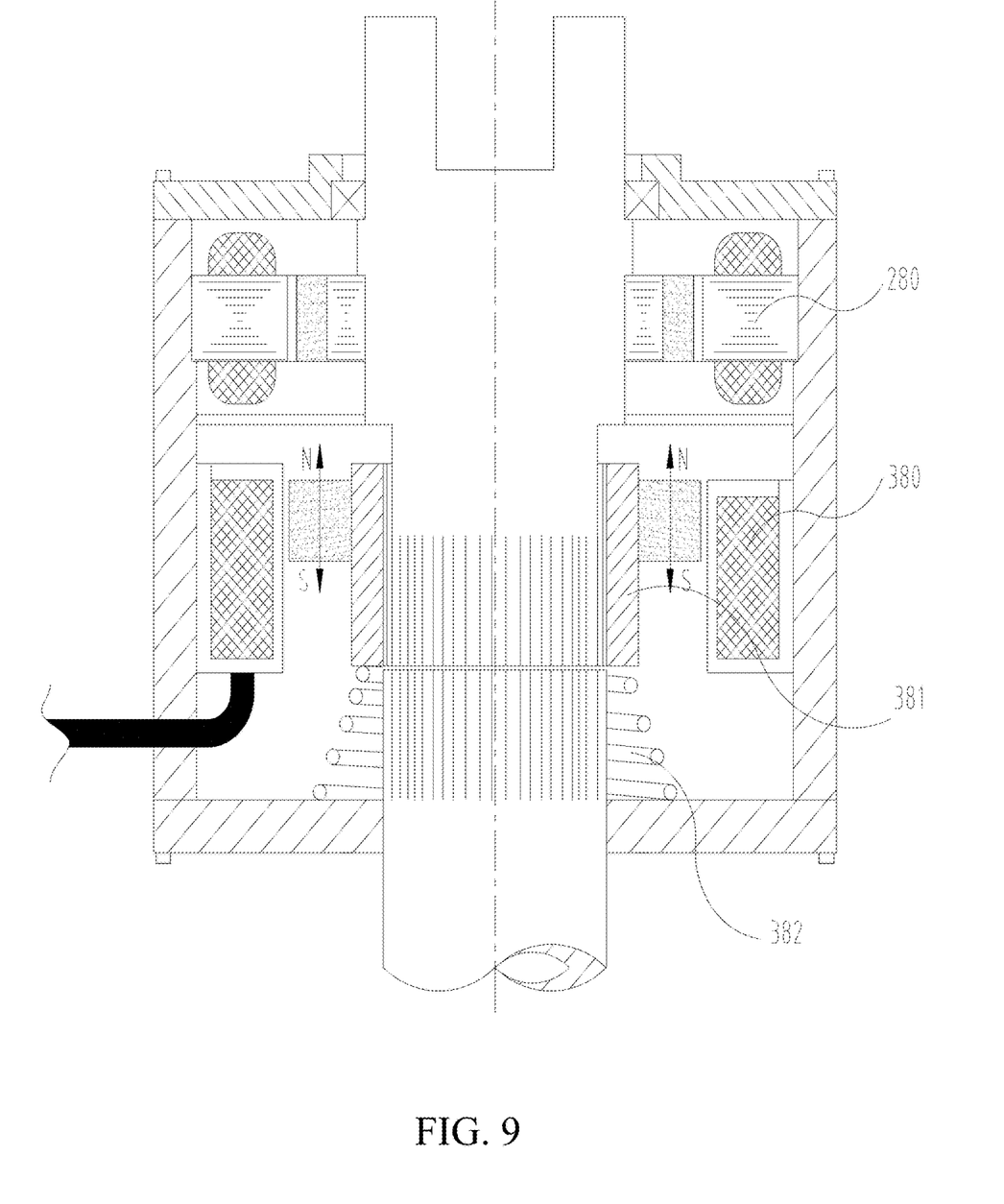
FIG. 9 is a longitudinal cross-sectional view of a steering system in a decoupled state according to still another embodiment of the present disclosure.

Referring to FIG. 7 to FIG. 9, the electric driving mechanism 300 may have various specific structures. In an optional embodiment, the electric driving mechanism 300 includes: a slidable sleeve 381, sleeved outside the steering wheel end shaft 600 and the steering device end shaft 700 and configured to translate along an axial direction of the steering wheel end shaft 600 and the steering device end shaft 700 to realize decoupling or coupling between the steering wheel end shaft 600 and the steering device end shaft 700; and a linear motor 380, where a mover of the linear motor 380 is fixedly connected with the slidable sleeve 381 and configured to drive the slidable sleeve 381 to translate along the axial direction of the steering wheel end shaft 600 and the steering device end shaft 700.

Specifically, internal splines may be machined on an inner circumferential surface of the slidable sleeve 381. For example, external splines 701 that can be engaged with the internal splines of the slidable sleeve 381 may be machined on an outer circumferential surface of the steering wheel end shaft 600 and the steering device end shaft 700. The mover of the linear motor 380 is fixedly connected with the slidable sleeve 381. For example, the mover and the slidable sleeve 381 are integrally formed, and a stator of the linear motor 380 is fixed to outer sides of the steering wheel end shaft 600 and the steering device end shaft 700. In a case that the motor is operating, the mover may translate along the axial direction of the steering wheel end shaft 600 and the steering device end shaft 700, and drive the slidable sleeve 381 to translate along the axial direction of the steering wheel end shaft 600 and the steering device end shaft 700.

Referring to FIG. 7 and FIG. 9, when the slidable sleeve 381 is axially translated to a first engagement position at which the slidable sleeve is engaged with only one of the steering wheel end shaft 600 and the steering device end shaft 700, the steering wheel end shaft 600 is decoupled from the steering device end shaft 700, and the vehicle may enter the game mode at this time. Referring to FIG. 8, when the slidable sleeve 381 is axially translated to a second engagement position at which the slidable sleeve is simultaneously engaged with the steering wheel end shaft 600 and the steering device end shaft 700, the steering wheel end shaft 600 is coupled to the steering device end shaft 700, and the vehicle may enter the normal driving mode at this time.

In the embodiments shown in FIG. 7 to FIG. 9, the steering wheel end shaft 600 and the slidable sleeve 381 are in a constant engagement state, and the slidable sleeve 381 is simultaneously engaged with the steering wheel end shaft 600 and the steering device end shaft 700 only in a coupled state.

When the slidable sleeve 381 is driven by the linear motor 380 to slide, since the mover of the linear motor 380 moves linearly, the mover and the slidable sleeve 381 may be directly fixed together, and the slidable sleeve 381 may be driven by the mover to translate. The slidable sleeve 381 herein may be a hollow cylinder structure or a circular arc plate structure.

The linear motor 380 may be, for example, an electromagnetic linear motor 380. In a case that the electromagnetic linear motor 380 is operating, the mover may translate along the axial direction of the steering wheel end shaft 600 and the steering device end shaft 700. It may be learned from the common knowledge in the field of machinery that in a case that no buffer element is disposed, vibration is inevitably caused during translation of a component. Therefore, the mover may also vibrate during the translation, causing unsmoothness during the translation. In an optional embodiment, in order to reduce the vibration of the mover during translation, an elastic element such as a spring 382 may be disposed on at least one side of the axial direction of the slidable sleeve, so as to improve the smoothness of the slidable sleeve during the translation by the elastic element, thereby achieving vibration reduction. In the embodiments shown in FIG. 7 to FIG. 9, only the spring 382 at a lower end of the slidable sleeve is shown.

In order to facilitate the mounting of the linear motor 380 and the spring 382, optionally, the steering system further includes an outer housing 301. The outer housing 301 is disposed coaxially with the steering wheel end shaft 600 and the steering device end shaft 700. The steering wheel end shaft 600 is axially rotatably supported in the outer housing 301, and the steering device end shaft 700 is fixed in the outer housing 301. The stator of the linear motor 380 is fixed in the outer housing 301, and the spring 382 at the lower end of the slidable sleeve may be mounted between a bottom of the outer housing 301 and a bottom of the slidable sleeve 381.

Specifically, the outer housing 301 may be a hollow cylinder, and the steering wheel end shaft 600 may extend into the hollow cylinder from a top end of the hollow cylinder, and is axially rotatably supported in the outer housing 301 by a rotary bearing 110 mounted in an upper cover plate 500 of the hollow cylinder. The steering device end shaft 700 may extend into the hollow cylinder from a bottom end of the hollow cylinder, and is fixedly connected with a lower bottom plate 403 of the hollow cylinder. The spring 382 is mounted between the lower bottom plate 403 of the hollow cylinder and the slidable sleeve 381, and the stator of the linear motor 380 is fixed to an inner side wall of the hollow cylinder.

In another embodiment, the electric driving mechanism 300 may further include: a slidable sleeve 800, sleeved outside the steering wheel end shaft 600 and the steering device end shaft 700 and configured to translate along an axial direction of the steering wheel end shaft 600 and the steering device end shaft 700 to realize decoupling or coupling between the steering wheel end shaft 600 and the steering device end shaft 700; and an interior rotor motor, where a rotor 303 of the interior rotor motor is a hollow structure; the hollow structure is axially rotatably mounted to the outer sides of the steering wheel end shaft 600 and the steering device end shaft 700; the slidable sleeve 800 is coaxially disposed in the hollow structure and is threadedly connected with the hollow structure; and the slidable sleeve 800 is driven by the rotor 303 during rotation to translate along the axial direction of the steering wheel end shaft 600 and the steering device end shaft 700.

Different from the linear motor 380, the rotor 303 of the interior rotor motor can only perform axial rotational motion, and cannot perform linear motion. In order to cause the interior rotor motor to drive the slidable sleeve 800 to translate along the axial direction of the steering wheel end shaft 600 and the steering device end shaft 700, the axial rotational motion of the rotor 303 of the interior rotor motor is required to be converted to axial translation of the slidable sleeve 800.

Figure 4:
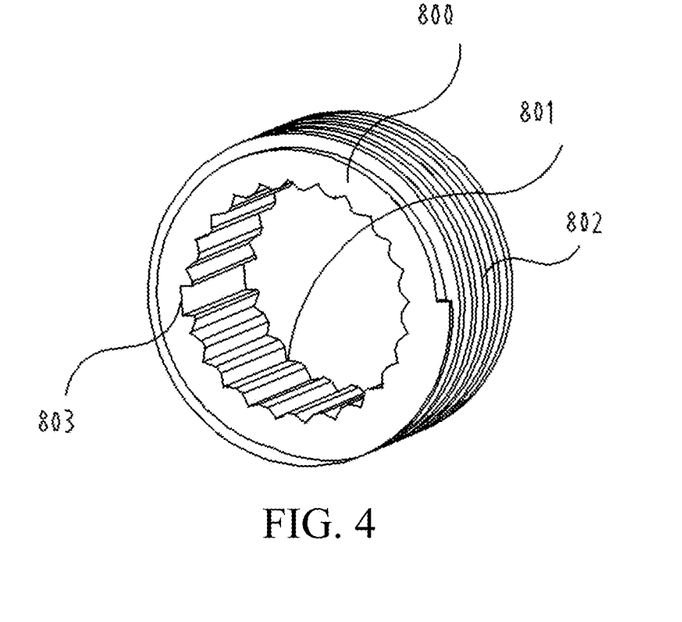
FIG. 4 is a schematic structural diagram of a slidable sleeve according to an embodiment of the present disclosure.
Figure 5:
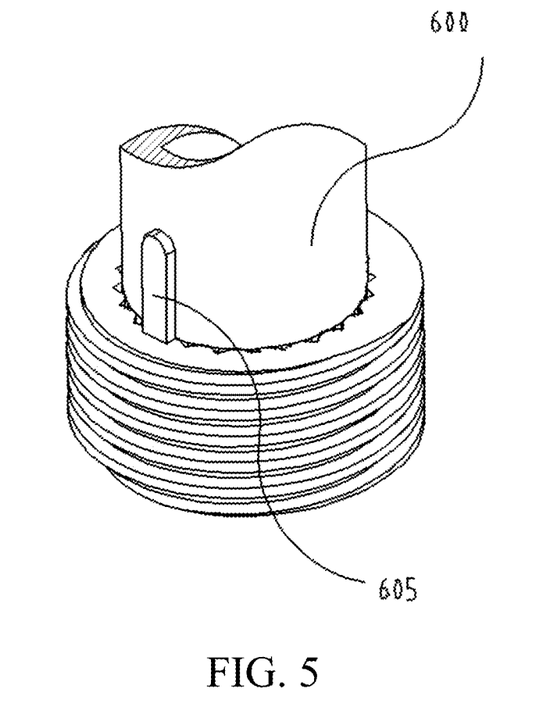
FIG. 5 is a schematic diagram of mounting of a slidable sleeve and a steering wheel end shaft or a steering device end shaft according to an embodiment of the present disclosure.

Referring to FIG. 4 and FIG. 5, in order to implement the above functions, the slidable sleeve 800 is connected with one of the steering wheel end shaft 600 and the steering device end shaft 700. In this way, the slidable sleeve 800 can translate along the axial direction of the steering wheel end shaft 600 and the steering device end shaft 700, but cannot perform circumferential displacement relative to the steering wheel end shaft 600 and the steering device end shaft 700. For example, a limiting groove 803 is machined on an inner circumferential surface of the slidable sleeve 800 along a direction parallel to the axial direction, and a protrusion 605 that is allowed to be accommodated in the limiting groove 803 is machined on the steering wheel end shaft 600 and/or the steering device end shaft 700. Internal threads are machined on an inner circumferential surface of the rotor 303, and external threads 802 are provided on an outer circumferential surface of the slidable sleeve 800. The slidable sleeve 800 is placed in the rotor 303 and is threadedly connected with the rotor 303. In this way, when the interior rotor motor is energized, the rotor 303 is rotatable, thereby driving the slidable sleeve 800 to translate along the axial direction of the steering wheel end shaft 600 and the steering device end shaft 700.

Referring to FIG. 2, when the slidable sleeve 800 is axially translated to the lower end, the steering wheel end shaft 600 is coupled to the steering device end shaft 700. When the user turns the steering wheel, the steering device end shaft 700 may be driven to rotate. The rotor 303 is axially rotatably mounted to the outer sides of the steering wheel end shaft 600 and the steering device end shaft 700 by rotating bearings 304 and 306. Since the rotor 303 is threadedly connected with the slidable sleeve 800, the rotor 303 may be driven to rotate synchronously during rotation of the steering wheel end shaft 600 and the steering device end shaft 700.

Referring to FIG. 3, when the slidable sleeve 800 is axially translated to an upper end, the steering wheel end shaft 600 is decoupled from the steering device end shaft 700. When the user turns the steering wheel 900, only the steering wheel end shaft 600 is driven to rotate, and the steering device end shaft 700 remains stationary. In addition, since the slidable sleeve 800 is sleeved outside the steering wheel end shaft 600, the slidable sleeve 800 rotates synchronously with the steering wheel end shaft 600 and drives the rotor 303 to rotate synchronously.

Referring to FIG. 2 and FIG. 3, in order to facilitate the mounting of the interior rotor motor, the steering system further includes an outer housing 301 disposed coaxially with the steering wheel end shaft 600 and the steering device end shaft 700. The steering wheel end shaft 600 is axially rotatably supported in the outer housing 301, the steering device end shaft 700 is fixed in the outer housing 301, and a stator 302 of the interior rotor motor is fixed in the outer housing 301.

Specifically, for the specific method for mounting the steering wheel end shaft 600 and the steering device end shaft 700 to the outer housing 301, reference may be made to the above. The stator 302 of the interior rotor motor is coaxially fixed in the outer housing 301. Optionally, wire holes are provided on the bottom of the outer housing 301, and a stator winding is led out of the outer housing 301 through the wire holes, and is electrically connected with an external power supply, an electric control device, and the like.

The steering wheel end shaft 600 and the steering device end shaft 700 are coaxially arranged and separated from each other. In this way, the steering wheel end shaft 600 may not drive the steering device end shaft 700 to rotate in the case of decoupling, and drives the steering device end shaft 700 to rotate in the case of coupling. The steering wheel end shaft 600 and the steering device end shaft 700 may be disposed in multiple manners. For example, the steering wheel end shaft 600 and the steering device end shaft 700 are axially spaced apart from each other. In an optional embodiment, in order to ensure coaxiality of the steering wheel end shaft 600 and the steering device end shaft 700, the steering wheel end shaft 600 is a hollow structure, for example, a hollow cylinder structure. One end of the steering device end shaft 700 is inserted into and radially separated from the hollow structure. Therefore, the coaxiality of the steering wheel end shaft 600 and the steering device end shaft 700 can be ensured, so as to facilitate the decoupling or coupling of the slidable sleeve 800.

Figure 10:
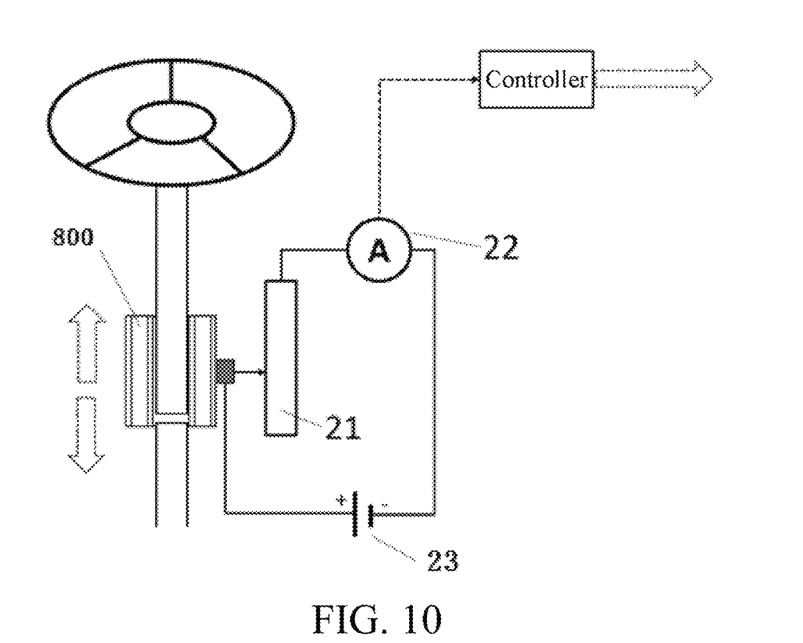
FIG. 10 is a schematic structural diagram of a status sensor according to an embodiment of the present disclosure.
Figure 11:
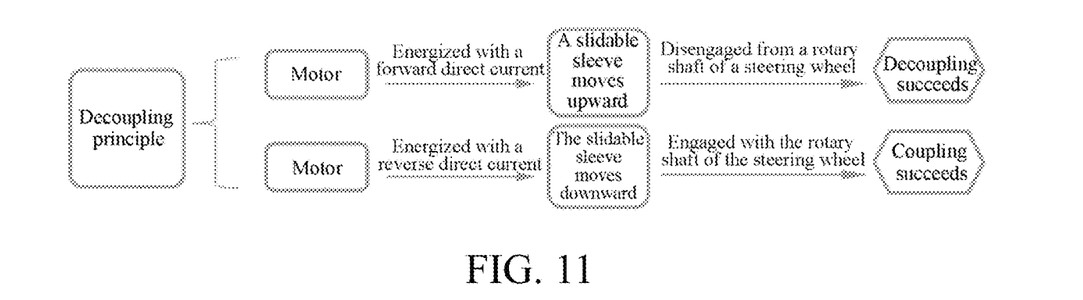
FIG. 11 is a flowchart of decoupling of the steering system according to an embodiment of the present disclosure.

Referring to FIG. 10 to FIG. 11, in an optional embodiment, the steering system further includes: a status sensor, configured to detect a decoupled state or the coupled state of the steering wheel end shaft 600 and the steering device end shaft 700; and a controller, configured to receive a decoupling instruction or a coupling instruction and control, according to the decoupled state or the coupled state detected by the status sensor, the motor to drive the slidable sleeve 800 to realize decoupling or coupling between the steering wheel end shaft 600 and the steering device end shaft 700.

Specifically, the controller is capable of receiving a decoupling signal or a coupling signal. When the decoupling or coupling is required, the controller may read the decoupled state or the coupled state of the steering wheel end shaft 600 and the steering device end shaft 700 by using the status sensor. When the decoupled signal is received and the controller determines that the steering wheel end shaft 600 and the steering device end shaft 700 are in the coupled state, the electric driving mechanism 300 is controlled to decouple the steering wheel end shaft 600 from the steering device end shaft 700. When the coupled signal is received and the controller determines that the steering wheel end shaft 600 and the steering device end shaft 700 are in the decoupled state, the electric driving mechanism 300 is controlled to couple the steering wheel end shaft 600 to the steering device end shaft 700.

Referring to FIG. 10, in a specific embodiment, the status sensor includes a rheostat 21, an ammeter 22, and a power supply 23. One end of the power supply 23 is electrically connected with a rheostat slider of the rheostat 21, and the other end of the power supply 23 is electrically connected with a measuring terminal of the ammeter 22. The other measuring terminal of the ammeter 22 is connected with one end of the rheostat 21. A signal output terminal of the ammeter 22 is connected with a signal of the controller, and the rheostat slider of the rheostat 21 is fixed to the slidable sleeve 800. It may be understood that, the above ammeter 22 may also be other current detection elements, for example, a current sensor. In some embodiments, the current sensor can detect a current of a circuit in the rheostat 21 without being connected in series in the circuit.

Since the rheostat slider of the rheostat 21 is fixed to the slidable sleeve 800, the rheostat slider may be driven to move when the slidable sleeve 800 slides. The effective resistance of the rheostat 21 connected with the circuit changes, so that the current in the circuit changes. A specific position of the rheostat slider may be learned by measuring the current in the circuit by using the ammeter 22. The controller is connected with the signal output terminal of the ammeter 22, receives the current signal detected by the ammeter 22, and determines the specific position of the rheostat slider according to the current signal. In this way, the specific position of the slidable sleeve 800 or 381 is learned, so that it can be determined whether the steering wheel end shaft 600 and the steering device end shaft 700 are in the decoupled state or the coupled state. In addition, the movement position of the slidable sleeve 800 or 381 can also be determined, and it may also be determined whether the rheostat slider has moved to an extreme position. For example, the rheostat slider moves up to a position where the top end is in contact with the inner rotor or the rheostat slider moves down to a position where the bottom end is in contact with the inner rotor. When it is determined that the slidable sleeve 800 or 381 has moved to the extreme position, the control of the electric driving mechanism 300 is stopped. In this way, the slidable sleeve 800 or 381 stops moving, thereby avoiding the phenomena such as motor stall.

For selection of the rheostat 21, the rheostat 21 having a larger resistance value should be used. It may be learned from a formula that a power is equal to a voltage multiplied by a current, that is, $P=UI$, that in order to reduce the power consumption of the status sensor, the current should be minimized under a premise that the voltage remains unchanged. The current is equal to a voltage divided by a resistance, that is, $I=U/R$. A larger resistance leads to a smaller current. Therefore, the resistance value of the rheostat 21 should be increased as much as possible within a range limit of the ammeter 22, to reduce the power consumption of the status sensor.

Since the resistance value of the rheostat 21 in the embodiment of the present disclosure may be continuously changed within a range, the status sensor may also continuously output state parameters of the slidable sleeve 800 or 381, which facilitates better control of the slidable sleeve 800 or 381.

In an optional embodiment, the status sensor can inspect the decoupled state or the coupled state of the steering wheel end shaft 600 and the steering device end shaft 700 according to a set period such as 50 ms. If it is found that the electric driving mechanism 300 is abnormal, the status sensor may cooperate with a driver assistant system/unmanned system of the vehicle to control the vehicle to pull over safely for inspection, thereby improving the safety of the vehicle.

In addition, the steering system may further include an alarm module. The alarm module is used in combination with the status sensor. Before the vehicle travels, the status sensor may be used to detect the state of the slidable sleeve 800 or 381. If the state of the slidable sleeve is the decoupled state, the vehicle is prohibited from traveling, and a reminder signal is sent to the driver, thereby improving the driving safety of the vehicle.

A control principle of the controller to the electric driving mechanism 300 is shown in FIG. 11. In an embodiment, when the controller controls a current inputted to the motor to be a forward direct current, the slidable sleeve 800 or 381 translates upward, and the steering wheel end shaft 600 and the steering device end shaft 700 are disengaged, thereby achieving the decoupling between the steering wheel end shaft and the steering device end shaft. In still another embodiment, when the controller controls the current inputted to the motor to be a reverse direct current, the slidable sleeve 800 or 381 translates downward, and the steering wheel end shaft 600 is engaged with the steering device end shaft 700, thereby achieving the coupling between the steering wheel end shaft and the steering device end shaft. The above motor is configured to drive the slidable sleeve 800 or 381 to move, and the motor may be, for example, a linear motor 380 or an interior rotor motor.

When the steering wheel end shaft 600 is decoupled from the steering device end shaft 700, the vehicle enters the game mode. In the game mode, the user is not subjected to resistance when operating the steering wheel, which affects the operation feeling of the steering wheel and degrades entertainment experience of the user.

In order to resolve the technical problem, the embodiments of the present disclosure further improve the steering system. Specifically, the steering system further includes a torque feedback mechanism. The torque feedback mechanism is configured to apply a reverse feedback torque to the steering wheel end shaft 600 according to a torsional torque of the steering wheel end shaft 600 in the decoupled state or an angular acceleration variation of the steering wheel end shaft 600, to prevent the steering wheel end shaft 600 from rotating, thereby enhancing the operation feeling of the steering wheel.

The reverse feedback torque is applied to the steering wheel by using the torque feedback mechanism according to the torsional torque or the angular acceleration variation. In this way, when the user operates the steering wheel to turn, a specific resistance is applied to the steering wheel, and the user has a "heavy" feeling when operating the steering wheel to turn in the game mode, which is equivalent to driving on a real road, thereby improving the operation experience of the user when using the vehicle for game entertainment.

A correspondence between the feedback torque and a detected torsional torque or the angular acceleration variation is established by using an experiment and prestored in a controller. The controller controls, according to the detected torsional torque or the angular acceleration variation, a magnitude of the feedback torque outputted by the torque feedback mechanism. In this way, optimal game experience can be provided for the user.

After the game is over, the steering wheel end shaft 600 may be coupled with the steering device end shaft 700, for example, by using the slidable sleeve 800 splined with the steering wheel end shaft 600 and the steering device end shaft 700. In this way, the vehicle enters the normal driving mode. The steering wheel end shaft 600 is constantly engaged with the slidable sleeve 800 by way of example. Upon completion of the decoupling, the steering wheel end shaft can be smoothly coupled to the slidable sleeve only when external splines 701 on the steering device end shaft 700 are aligned to internal splines of the slidable sleeve 800.

However, after the steering wheel end shaft 600 is decoupled from the steering device end shaft 700, for example, if the user operates the steering wheel to turn during the game, after the game is over, the steering wheel may not be at a steering angle before the decoupling. The deflection of the steering wheel causes the steering wheel end shaft 600 to deflect, thereby causing the steering angle of the slidable sleeve 800 or 381 to change relative to the steering angle before the decoupling. When the slidable sleeve 800 or 381 is not aligned to the steering device end shaft 700 (as described in the previous paragraph, when the external splines 701 on the steering device end shaft 700 are aligned to the internal splines of the slidable sleeve 800, the steering device end shaft can be smoothly coupled to the slidable sleeve. When the external splines 701 on the steering device end shaft 700 are not aligned to the internal splines of the slidable sleeve 800, the steering device end shaft cannot be smoothly coupled to the slidable sleeve), the steering wheel end shaft 600 cannot be coupled to the steering device end shaft 700 again after the game, which affects the normal use of the vehicle.

In order to solve the technical problem, in an optional implementation of the present disclosure, the torque feedback mechanism is further configured to apply the reverse feedback torque to the steering wheel end shaft 600 upon completion of the decoupling, to drive the steering wheel end shaft 600 to be reset to the steering angle before the decoupling. Before the steering wheel end shaft 600 is decoupled from the steering device end shaft 700, the slidable sleeve 800 or 381 is aligned to the steering device end shaft 700. Therefore, at this angle, the coupling between the steering wheel end shaft 600 and the steering device end shaft 700 can be achieved.

A structure of the torque feedback mechanism may vary. In an optional embodiment, the torque feedback mechanism includes: a torque detection element, configured to detect a torsional torque of the steering wheel end shaft 600 in the decoupled state; an angle detection element, configured to detect steering angles of the steering wheel end shaft 600 before and after the game; a power element, configured to provide a driving force; a transmission mechanism, configured to transmit the driving force to the steering wheel end shaft 600 to apply the reverse feedback torque to the steering wheel end shaft 600; and a controller, configured to control, according to the torsional torque detected by the torque detection element, the power element to provide the driving force.

Specifically, the torque detection element may be, for example, a torque sensor, and the angle detection element may be, for example, an angle sensor. Optionally, the torque detection element and the angle detection element may be integrated as a whole. For example, the torque and angle detection of the steering wheel end shaft 600 is realized by using a torque angle sensor, and the torque angle sensor may be mounted to the steering wheel end shaft 600.

Referring to FIG. 1, the torque feedback mechanism may also detect a steering angle and an angular acceleration variation of the steering wheel end shaft 600 by using a rotation angle sensor 901. The rotation angle sensor 901 may be mounted to one end of the steering wheel end shaft 600 coupled to the steering wheel 900.

The power element may be, for example, a motor, and the controller may be, for example, a single-chip microcomputer, a programmable logic controller, or the like. The controller may control the input current of the motor according to the magnitude of the detected torsional torque or the angular acceleration variation of the steering wheel end shaft 600, thereby changing the driving force outputted by the motor. Alternatively, when the resetting is required, a magnitude and a direction of the input current of the motor may be controlled according to the angle detected by the angle detection element, to control the steering wheel end shaft 600 to be reset. In the reset mode, the motor is in a driving state, and the steering wheel is driven to be reset by the motor. In a loading mode, the motor is in a power generation state or the magnitude of the driving force of the motor is changed by changing the magnitude of the input current of the motor, thereby applying different feedback torques to the steering wheel end shaft 600.

The motor may be an outer rotor motor 200 or an inner rotor motor 280, and the outer rotor motor 200 may be, for example, a direct current (DC) brushless motor. The method for mounting the torque feedback mechanism to the steering wheel end shaft 600 varies with the type of the motor. Specifically, the motor is used as the outer rotor motor 200 by way of example. A stator 201 of the outer rotor motor 200 is coaxially fixed to the steering wheel end shaft 600, and an outer rotor 203 is axially rotatably mounted to the steering wheel end shaft 600 by a rolling bearing 202. The transmission mechanism is a planetary gear reduction mechanism 100. The planetary gear reduction mechanism 100 is disposed coaxially with the steering wheel end shaft 600, and configured to transmit rotary power of the outer rotor 203 to the steering wheel end shaft 600.

Figure 6:
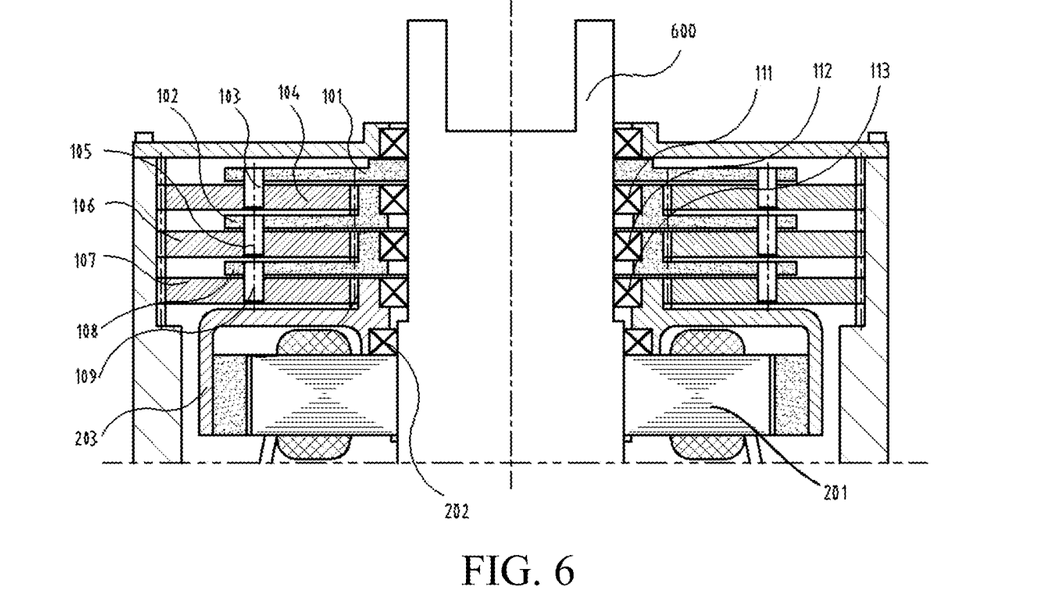
FIG. 6 is a schematic diagram of mounting of a torque feedback mechanism and a steering wheel end shaft according to an embodiment of the present disclosure.

Specifically, referring to FIG. 6, the planetary gear reduction mechanism 100 includes multiple stages of sun gear mechanisms arranged coaxially with the steering wheel end shaft 600. Two adjacent stages of sun gear mechanisms are axially spaced apart from each other. A last-stage sun gear mechanism 101 is located at an uppermost end and is fixed coaxially with the steering wheel end shaft 600, and other sun gear mechanisms are axially rotatably is mounted to the steering wheel end shaft 600 by the rotary bearings 111 and 112. Except for the last-stage sun gear mechanism, each stage of the sun gear mechanisms in the other sun gear mechanisms is in gear meshing with planetary gears, where the planetary gears are revolvable around an axis of the stage of the sun gear mechanisms and rotatable around their own axes. A central shaft of the planetary gears meshed with an $N^{th}$-stage sun gear mechanism is connected with an $(N+1)^{th}$-stage sun gear mechanism. N is an integer, and N is greater than or equal to 1 and less than a total number of the stages of the sun gear mechanisms. Planetary gears 107 are in gear meshing with the outer rotor 203, and a central shaft 109 of the planetary gears 107 is connected with a first-stage sun gear mechanism 108.

Specifically, except for the last-stage sun gear mechanism 101, the structures of other sun gear mechanisms are basically the same, and the last-stage sun gear mechanism 101 is circular and is coaxially fixed to the outer side of the steering wheel end shaft 600. Other sun gear mechanisms are also circular, but these sun gear mechanisms have two axial sections having different radial dimensions in the axial direction. The radial dimension of a lower axial section is larger than that of an upper axial section. A gear structure capable of being meshed with the planetary gears is formed on an outer circumferential surface of the upper axial section, and the lower axial section serves as a support for supporting the planetary gear. The central shaft of the planetary gears meshed with the $N^{th}$-stage sun gear mechanism is connected with the lower axial section of the $(N+1)^{th}$-stage sun gear mechanism. An upper end of the outer rotor 203 axially extends upward to form a gear sleeve sleeved outside the steering wheel end shaft 600. A gear structure is formed on an outer circumferential surface of the gear sleeve, and the planetary gear 107 is in gear meshing with the gear sleeve of the outer rotor 203. Therefore, when the outer rotor 203 rotates, the planetary gears 107 are driven to revolve around the axis of the sun gear mechanism and rotate around their own axes.

Optionally, in order to ensure the smoothness of the transmission, a rotary bearing 113 may be added between the inner circumferential surface of the gear sleeve and the outer circumferential surface of the steering wheel end shaft 600. The gear sleeve is fixedly connected with an outer circumferential surface of the rotary bearing 113, and an inner circumferential surface of the rotary bearing 113 is fixedly connected with the steering wheel end shaft 600.

In order to axially rotatably mount other sun gear mechanisms except the last-stage sun gear mechanism 101 to the steering wheel end shaft 600 by the rotary bearings 111 and 112, limiting steps that can abut against lower end surfaces of an outer rings of the rotary bearing 111 and 112 are formed on an inner circumferential surface of the other sun gear mechanisms.

When the outer rotor 203 rotates, the planetary gears 107 are driven to revolve around the central axis of the steering wheel end shaft and rotate around their own axes. Since the planetary gears 107 are connected with the first-stage sun gear mechanism 108, the first-stage sun gear mechanism 108 is driven to rotate when the planetary gears 107 revolve. Since the first-stage sun gear mechanism 108 is in gear meshing with the planetary gears 106, when the first-stage sun gear mechanism 108 rotates around its own axis, the planetary gears 106 are driven to rotate around a central shaft of the first-stage sun gear mechanism 108 and rotate around its own axis, and then successive transmission occurs until the last-stage sun gear mechanism 101 is driven to rotate. Since the last-stage sun gear mechanism 101 is fixedly connected with the steering wheel end shaft 600, the rotary power may be transmitted to the steering wheel end shaft 600, thereby applying the feedback torque to the steering wheel end shaft 600.

The number of stages of the sun gear mechanism may be set as required. In the embodiments shown in FIG. 2 to FIG. 3 and FIG. 6 to FIG. 8, a total of three stages of sun gear mechanisms are disposed. Certainly, the number of stages of the sun gear mechanisms may also be changed. In addition, the number of planetary gears meshed with each stage of the sun gear mechanisms and the outer rotor may be set as required. In the embodiments shown in FIG. 2 to FIG. 3 and FIG. 6 to FIG. 8, the number of planetary gears meshed with each stage of the sun gear mechanisms and the outer rotor is at least two. It may be understood that the number may be one or more.

In the reset mode, the above planetary gear reduction mechanism 100 can reduce a rotating speed of the outer rotor 203 and transfer the reduced rotating speed to the steering wheel end shaft 600, thereby accurately controlling the steering angle of the steering wheel end shaft 600. In the loading mode, the above planetary gear reduction mechanism 100 may also increase the rolling torque of the outer rotor 203 and feed the rolling torque back to the steering wheel end shaft 600. Therefore, a small-power and small-volume motor may be used to realize the functions of resetting and loading the steering wheel end shaft 600, so as to facilitate the mounting of the motor.

As described above, the motor may further be an inner rotor motor 280. As shown in FIG. 9, when the motor is the inner rotor motor 280, the transmission mechanism may be removed, and the inner rotor of the inner rotor motor 280 may be directly fixed to the steering wheel end shaft 600. That is to say, the inner rotor is disposed as a hollow structure. The hollow structure is coaxially fixed to the outer side of the steering wheel end shaft 600. In a case that the inner rotor motor 280 is energized, the power of the inner rotor may be directly transmitted to the steering wheel end shaft 600 to apply the feedback torque to the steering wheel end shaft 600.

Optionally, the torque feedback mechanism may be mounted in the outer housing 301. In a case that the steering system is configured with both the torque feedback mechanism and the electric driving mechanism 300, the torque feedback mechanism and the electric driving mechanism 300 may be integrated in the same outer housing 301. For the specific method for mounting the outer housing 301 and the steering wheel end shaft 600 and the steering device end shaft 700, reference is made to the above description, and details are not described herein again.

The torque feedback mechanism and the electric driving mechanism 300 each has a motor. A motor lead wire 204 of the torque feedback mechanism and a motor lead wire 305 of the electric driving mechanism 300 may be combined together and led out from the same wire hole on the outer housing 301. For example, the wire hole may be provided on a bottom end of the outer housing 301, or may be formed on a side of the outer housing 301.

When the steering system is configured with the planetary gear reduction mechanism 100, a gear structure capable of being meshed with the planetary gears 104, 106, and 107 may further be formed corresponding to the planetary gears 104, 106, and 107 in the planetary gear reduction mechanism 100 on the inner circumferential surface of the outer housing 301, to further improve the stability of the operation of the planetary gear reduction mechanism 100.

When the inner rotor motor 280 is selected as the motor in the torque feedback mechanism, the stator 201 of the inner rotor motor 280 is coaxially fixed to the outer housing 301.

The working principle of the steering system provided in the embodiments of the present disclosure is as follows.

The user sends a game start or end request by using a client such as a tablet PC PAD, and a controller A receives the request and controls the motor of the electric driving mechanism 300 to realize decoupling or coupling between the steering wheel end shaft 600 and the steering device end shaft 700. When the steering wheel end shaft 600 is successfully decoupled from the steering device end shaft 700, the decoupling is fed back to a controller B by using an vehicular communication unit (VCU) and a CAN bus, and the controller B controls the operating status of the motor in the torque feedback mechanism according to the received signal.

Specifically, when the steering wheel end shaft 600 is successfully decoupled from the steering device end shaft 700, the vehicle enters the game mode, and the controller B controls the torque feedback mechanism to enter the loading mode. For example, the magnitude of the loading torque fed back to the steering wheel end shaft 600 may be controlled by changing the magnitude of the input current of the motor in the torque feedback mechanism. The magnitude of the loading torque may be controlled according to the detected torsional torque and by using a magnitude of an absolute value of a steering wheel angular acceleration variation. When no angular variation is received (an unchanged angle indicates that the game ends and the user stops operating the steering wheel) or when the game ends, the controller B controls the torque feedback mechanism to switch to the reset mode. In the reset mode, the controller B controls the rotation direction of the motor depending on whether the angle of the steering wheel end shaft 600 is in a positive relationship or a negative relationship with an initial position at the end of the game, and finally causes the motor to run to the initial position to complete the resetting. The controller B transmits the signal to the VCU after the resetting succeeds. The VCU transmits a reset success signal to the controller A after receiving the signal, and the motor in the electric driving mechanism 300 starts to run, to complete the coupling. A signal indicating the successful coupling may be transmitted to the client by using the VCU.

In addition, the status sensor inspects the status of the electric driving mechanism 300 according to a set period, and when a decoupling fault occurs, a decoupling fault signal is sent to the user to stop the vehicle for inspection.

Figure 12:
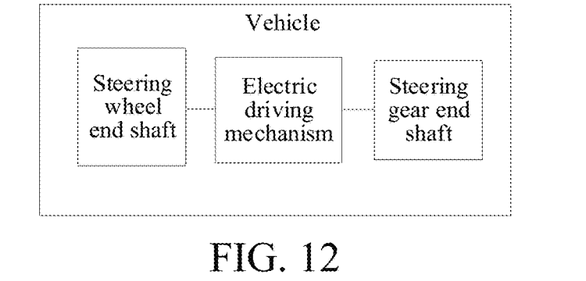
FIG. 12 is a structural block diagram of a vehicle according to an embodiment of the present disclosure.

Referring to FIG. 12, based on the steering system provided in the first aspect of the embodiments of the present disclosure, a second aspect of the embodiment of the present disclosure provides a vehicle. The vehicle includes the steering system according to the first aspect of the embodiments of the present disclosure.

The preferred embodiments of the present disclosure are described in detail above with reference to the accompanying drawings, but the present disclosure is not limited thereto. Various simple variations, including the combination of the technical features in any suitable manner, may be made to the technical solutions of the present disclosure within the scope of the technical idea of the present disclosure. To avoid unnecessary repetition, various possible combinations are not further described in the present disclosure. However, such simple variations and combinations shall also be considered as the content disclosed by the present disclosure and shall all fall within the protection scope of the present disclosure.

What is claimed is:

1. A steering system, comprising a steering wheel end shaft, a steering device end shaft, and an electric driving mechanism configured to drive decoupling or coupling of the steering wheel end shaft and the steering device end shaft that are coaxially disposed,
the steering system further comprises a torque feedback mechanism, configured to apply a reset torque to the steering wheel end shaft upon completion of the decoupling, to drive the steering wheel end shaft to be reset to a steering angle before the decoupling.

2. The steering system according to claim 1, further comprising a torque feedback mechanism, configured to apply a damping torque to the steering wheel end shaft in a decoupled state, to enhance an operation feeling of a steering wheel drive-connected with the steering wheel end shaft.

3. The steering system according to claim 2, wherein the torque feedback mechanism is arranged coaxially with the steering wheel end shaft.

4. The steering system according to claim 3, further comprising an outer housing, disposed coaxially with the steering wheel end shaft and the steering device end shaft, wherein the steering wheel end shaft is axially rotatably supported in the outer housing; the steering device end shaft is fixed in the outer housing; and the torque feedback mechanism and/or the electric driving mechanism are/is mounted in the outer housing.

5. The steering system according to claim 4, wherein the torque feedback mechanism comprises:
an outer rotor motor, disposed coaxially with the steering wheel end shaft and configured to provide a driving force; and
a planetary gear reduction mechanism, disposed coaxially with the steering wheel end shaft and configured to transfer, to the steering wheel end shaft, the driving force provided by the outer rotor motor, to apply the damping torque or the reset torque to the steering wheel end shaft.

6. The steering system according to claim 5, further wherein a stator of the outer rotor motor is fixed coaxially with the steering wheel end shaft; and an outer rotor of the outer rotor motor is axially rotatably mounted to the steering wheel end shaft by a rotary bearing.

7. The steering system according to claim 6, wherein the planetary gear reduction mechanism comprises: a plurality of stages of sun gear mechanisms, arranged coaxially with the steering wheel end shaft, wherein two adjacent stages of sun gear mechanisms are axially spaced apart from each other; a last-stage sun gear mechanism is fixed coaxially with the steering wheel end shaft; other sun gear mechanisms are axially rotatably mounted to the steering wheel end shaft by rolling bearings; each stage of the sun gear mechanisms in the other sun gear mechanisms is in gear meshing with planetary gears, wherein the planetary gears are revolvable around an axis of the stage of the sun gear mechanisms and rotatable; a central shaft of the planetary gears meshed with an $N^{th}$-stage sun gear mechanism is connected with an $(N+1)^{th}$-stage sun gear mechanism; N is an integer; N is greater than or equal to 1 and less than a total number of the stages of the sun gear mechanisms; and planetary gears having a central shaft connected with a first-stage sun gear mechanism are in gear meshing with the outer rotor.

8. The steering system according to claim 4, wherein the torque feedback mechanism comprises: an inner rotor motor, wherein a rotor of the inner rotor motor is coaxially fixed to the steering wheel end shaft.

9. The steering system according to claim 1, wherein the electric driving mechanism comprises:
a slidable sleeve, sleeved outside the steering wheel end shaft and the steering device end shaft and configured to translate along an axial direction of the steering wheel end shaft and the steering device end shaft to realize decoupling or coupling between the steering wheel end shaft and the steering device end shaft; and
a motor, configured to provide a driving force to drive the slidable sleeve to translate along the axial direction of the steering wheel end shaft and the steering device end shaft.

10. The steering system according to claim 9, wherein the motor is a linear motor; a mover of the linear motor is fixedly connected with the slidable sleeve; and an elastic element is disposed on at least one axial end of the slidable sleeve to reduce vibration of the slidable sleeve during the translation along the axial direction.

11. The steering system according to claim 9, wherein the motor is an interior rotor motor; a rotor of the interior rotor motor is a hollow structure; the hollow structure is axially rotatably mounted to outer sides of the steering wheel end shaft and the steering device end shaft; and the slidable sleeve is coaxially disposed in the hollow structure and is threadedly connected with the hollow structure.

12. The steering system according to claim 11, wherein a limiting groove and splines are formed on an inner circumferential surface of the slidable sleeve along a direction parallel to the axis; a protrusion configured to be accommodated in the limiting groove is formed on an outer circumferential surface of one of the steering wheel end shaft and the steering device end shaft; and external splines configured to be splined with the slidable sleeve are formed on an outer circumferential surface of the other of the steering wheel end shaft and the steering device end shaft.

13. The steering system according to claim 9, further comprising an outer housing, disposed coaxially with the steering wheel end shaft and the steering device end shaft, wherein the steering wheel end shaft is axially rotatably supported in the outer housing; the steering device end shaft is fixed in the outer housing; and a stator of the motor is fixed in the outer housing.

14. The steering system according to claim 9, further comprising:
a status sensor, configured to detect the decoupled state or a coupled state of the steering wheel end shaft and the steering device end shaft; and
a controller, configured to receive a decoupling instruction or a coupling instruction and control, according to the decoupled state or the coupled state detected by the status sensor, the motor to drive the slidable sleeve to realize decoupling or coupling between the steering wheel end shaft and the steering device end shaft.

15. The steering system according to claim 14, wherein the status sensor is configured to inspect the decoupled state or the coupling state of the steering wheel end shaft and the steering device end shaft according to a set period.

16. The steering system according to claim 14, further comprising an alarm module, configured to send an alarm signal before a vehicle travels and when the status sensor detects that the steering wheel end shaft and the steering device end shaft are in the decoupled state.

17. The steering system according to claim 14, wherein the status sensor comprises a rheostat, a current detection element, and a power supply; the power supply is connected in series with the rheostat to form a circuit; the current detection element is configured to detect a current in the circuit and transmit a detected current signal to the controller; and a rheostat slider of the rheostat is fixed to the slidable sleeve.

18. The steering system according to claim 17, wherein the controller is further configured to stop controlling the motor when the slidable sleeve is moved to an extreme position.

19. A vehicle, comprising the steering system according to claim 1.

* * * * *